United States Patent
Bartel

(10) Patent No.: US 9,551,210 B2
(45) Date of Patent: Jan. 24, 2017

(54) SYSTEMS AND METHODS FOR REMOVAL OF ELECTROMAGNETIC DISPERSION AND ATTENUATION FOR IMAGING OF PROPPANT IN AN INDUCED FRACTURE

(71) Applicant: Carbo Ceramics Inc., Houston, TX (US)

(72) Inventor: Lewis Bartel, Albuquerque, NM (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 14/460,715

(22) Filed: Aug. 15, 2014

(65) Prior Publication Data

US 2016/0047933 A1    Feb. 18, 2016

(51) Int. Cl.
*G01V 3/20* (2006.01)
*G01V 3/30* (2006.01)
(Continued)

(52) U.S. Cl.
CPC .............. *E21B 47/00* (2013.01); *E21B 43/267* (2013.01); *G01V 3/20* (2013.01); *G01V 3/26* (2013.01);
(Continued)

(58) Field of Classification Search
CPC ............ G01V 3/12; G01V 3/26; G01V 3/265; G01V 3/30
(Continued)

(56) References Cited

U.S. PATENT DOCUMENTS 3,103,975 A    9/1963 Hanson
3,376,930 A    4/1968 Kiel et al.
(Continued)

FOREIGN PATENT DOCUMENTS

WO    2014/004815 A1    1/2014
WO    2014/107608 A1    7/2014
(Continued)

OTHER PUBLICATIONS

Gurevich et al., Velocity and attenuation of elastic waves in finely layered porous rocks, Geophys J. Inr. (1995) 121, p. 913-937.*
(Continued)

*Primary Examiner* — Gregory J Toatley
*Assistant Examiner* — Michael Dalbo
(74) *Attorney, Agent, or Firm* — Patterson & Sheridan, LLP

(57) ABSTRACT

Systems and methods for generating a three-dimensional image of a proppant-filled hydraulically-induced fracture in a geologic formation are provided. The image may be generated by capturing electromagnetic fields generated or scattered by the proppant-filled fracture, removing dispersion and/or an attenuation effects from the captured electromagnetic fields, and generating the image based on the dispersion and/or attenuation corrected fields. Removing the dispersion and/or attenuation effects may include back propagating the captured electromagnetic fields in the time domain to a source location. The image may be generated based on locations at which the back propagated fields constructively interfere or may be generated based on a model of the fracture defined using the back propagated fields.

12 Claims, 9 Drawing Sheets

(51) Int. Cl.
    *E21B 43/267* (2006.01)
    *E21B 47/00* (2012.01)
    *G01V 3/26* (2006.01)

(52) U.S. Cl.
    CPC ............. *G01V 3/30* (2013.01); *G01V 2210/67* (2013.01); *G01V 2210/671* (2013.01); *G01V 2210/679* (2013.01)

(58) Field of Classification Search
    USPC .................................................... 702/11, 12
    See application file for complete search history.

(56) References Cited

U.S. PATENT DOCUMENTS

| | | | |
|---|---|---|---|
| 3,492,147 A | 1/1970 | Young et al. | |
| 3,533,829 A | 10/1970 | Quanquin | |
| 3,659,259 A | 4/1972 | Chaney, Jr. et al. | |
| 3,772,589 A | 11/1973 | Scholberg | |
| 3,929,191 A | 12/1975 | Graham et al. | |
| 4,030,549 A | 6/1977 | Bouck | |
| 4,068,718 A | 1/1978 | Cooke, Jr. et al. | |
| 4,181,014 A | 1/1980 | Zuvela et al. | |
| 4,401,162 A | 8/1983 | Osborne | |
| 4,427,068 A | 1/1984 | Fitzgibbon | |
| 4,440,866 A | 4/1984 | Lunghofer et al. | |
| 4,491,796 A | 1/1985 | Smith | |
| 4,550,779 A | 11/1985 | Zakiewicz | |
| 4,567,945 A | 2/1986 | Segalman | |
| 4,585,064 A | 4/1986 | Graham et al. | |
| 4,613,161 A | 9/1986 | Brisco | |
| 4,705,108 A | 11/1987 | Little et al. | |
| 4,724,434 A | 2/1988 | Hanson et al. | |
| 4,802,359 A | 2/1989 | Patrice | |
| 4,806,928 A | 2/1989 | Veneruso | |
| 4,839,644 A | 6/1989 | Safinya et al. | |
| 4,851,781 A | 7/1989 | Marzetta et al. | |
| 4,879,181 A | 11/1989 | Fitzgibbon | |
| 4,901,069 A | 2/1990 | Veneruso | |
| 4,942,926 A | 7/1990 | Lessi | |
| 4,986,530 A | 1/1991 | Steinhilber | |
| 5,008,661 A | 4/1991 | Raj | |
| 5,038,107 A | 8/1991 | Gianzero et al. | |
| 5,151,658 A | 9/1992 | Muramatsu et al. | |
| 5,188,175 A | 2/1993 | Sweet | |
| 5,200,705 A | 4/1993 | Clark et al. | |
| 5,353,873 A | 10/1994 | Cooke, Jr. | |
| 5,486,764 A | 1/1996 | Thompson et al. | |
| 5,509,474 A | 4/1996 | Cooke, Jr. | |
| 5,542,472 A | 8/1996 | Pringle et al. | |
| 5,543,715 A | 8/1996 | Singer et al. | |
| 5,547,029 A | 8/1996 | Rubbo et al. | |
| 5,563,514 A | 10/1996 | Moulin | |
| 5,576,703 A | 11/1996 | MacLeod et al. | |
| 5,597,042 A | 1/1997 | Tubel et al. | |
| 5,662,165 A | 9/1997 | Tubel et al. | |
| 5,692,565 A | 12/1997 | MacDougall et al. | |
| 5,945,923 A | 8/1999 | Soulier | |
| 5,959,547 A | 9/1999 | Tubel et al. | |
| 6,006,831 A | 12/1999 | Schlemmer et al. | |
| 6,023,168 A | 2/2000 | Minerbo | |
| 6,025,721 A | 2/2000 | Vail, III | |
| 6,061,000 A | 5/2000 | Edwards | |
| 6,070,662 A | 6/2000 | Ciglenec et al. | |
| 6,116,342 A | 9/2000 | Clark et al. | |
| 6,131,658 A | 10/2000 | Minear | |
| 6,148,911 A | 11/2000 | Gipson et al. | |
| 6,161,434 A * | 12/2000 | Fink ...................... | G01N 29/14 73/587 |
| 6,216,783 B1 | 4/2001 | Hocking et al. | |
| 6,234,257 B1 | 5/2001 | Ciglenec et al. | |
| 6,302,203 B1 | 10/2001 | Rayssiguier et al. | |
| 6,330,914 B1 | 12/2001 | Hocking et al. | |
| 6,378,610 B2 | 4/2002 | Rayssiguier et al. | |
| 6,408,943 B1 | 6/2002 | Schultz et al. | |
| 6,411,084 B1 | 6/2002 | Yoo | |
| 6,426,917 B1 | 7/2002 | Tabanou et al. | |
| 6,443,227 B1 | 9/2002 | Hocking et al. | |
| 6,443,228 B1 | 9/2002 | Aronstam et al. | |
| 6,474,415 B1 | 11/2002 | Ohmer | |
| 6,538,576 B1 | 3/2003 | Schultz et al. | |
| 6,597,178 B1 | 7/2003 | Nichols et al. | |
| 6,626,238 B2 | 9/2003 | Hooper | |
| 6,633,164 B2 | 10/2003 | Vinegar et al. | |
| 6,684,952 B2 | 2/2004 | Brockman et al. | |
| 6,691,779 B1 | 2/2004 | Sezginer et al. | |
| 6,691,780 B2 | 2/2004 | Nguyen et al. | |
| 6,693,553 B1 | 2/2004 | Ciglenec et al. | |
| 6,719,055 B2 | 4/2004 | Mese et al. | |
| 6,725,926 B2 | 4/2004 | Nguyen et al. | |
| 6,725,930 B2 | 4/2004 | Boney et al. | |
| 6,766,854 B2 | 7/2004 | Ciglenec et al. | |
| 6,815,946 B2 | 11/2004 | Yoo | |
| 6,856,255 B2 | 2/2005 | Chalitsios et al. | |
| 6,864,801 B2 | 3/2005 | Tabanou et al. | |
| 6,876,959 B1 | 4/2005 | Peirce et al. | |
| 6,910,534 B2 | 6/2005 | Linyaev et al. | |
| 6,943,697 B2 | 9/2005 | Ciglenec et al. | |
| 6,959,773 B2 | 11/2005 | Mese et al. | |
| 6,987,463 B2 | 1/2006 | Beique et al. | |
| 7,000,697 B2 | 2/2006 | Goode et al. | |
| 7,009,707 B2 | 3/2006 | Beresford et al. | |
| 7,036,591 B2 | 5/2006 | Cannan et al. | |
| 7,073,581 B2 | 7/2006 | Nguyen et al. | |
| 7,082,993 B2 | 8/2006 | Ayoub et al. | |
| 7,095,223 B2 | 8/2006 | Yoo | |
| 7,140,434 B2 | 11/2006 | Chouzenoux et al. | |
| 7,151,377 B2 | 12/2006 | Chouzenoux et al. | |
| 7,168,487 B2 | 1/2007 | Salamitou et al. | |
| 7,173,542 B2 | 2/2007 | Beique et al. | |
| 7,187,961 B2 | 3/2007 | Yamashita et al. | |
| 7,210,526 B2 | 5/2007 | Knobloch | |
| 7,219,730 B2 | 5/2007 | Tilton et al. | |
| 7,319,330 B2 | 1/2008 | Amundsen | |
| 7,325,605 B2 | 2/2008 | Fripp et al. | |
| 7,331,385 B2 | 2/2008 | Symington et al. | |
| 7,398,680 B2 | 7/2008 | Glasbergen et al. | |
| 7,424,911 B2 | 9/2008 | McCarthy et al. | |
| 7,450,053 B2 | 11/2008 | Funk et al. | |
| 7,451,812 B2 | 11/2008 | Cooper et al. | |
| 7,453,768 B2 | 11/2008 | Hall et al. | |
| 7,502,690 B2 | 3/2009 | Thomsen et al. | |
| 7,568,532 B2 | 8/2009 | Kuckes et al. | |
| 7,597,146 B2 | 10/2009 | Winslow et al. | |
| 7,598,898 B1 | 10/2009 | Funk et al. | |
| 7,602,688 B2 | 10/2009 | Lee | |
| 7,631,691 B2 | 12/2009 | Symington et al. | |
| 7,637,318 B2 | 12/2009 | Sierra et al. | |
| 7,644,762 B2 | 1/2010 | Knobloch | |
| 7,703,515 B2 | 4/2010 | Chouzenoux et al. | |
| 7,712,527 B2 | 5/2010 | Roddy | |
| 7,726,397 B2 | 6/2010 | McDaniel et al. | |
| 7,728,900 B2 | 6/2010 | Fukushima et al. | |
| 7,779,683 B2 | 8/2010 | Glasbergen et al. | |
| 7,798,214 B2 | 9/2010 | Schmitt et al. | |
| 7,836,952 B2 | 11/2010 | Fripp | |
| 7,893,801 B2 | 2/2011 | Knobloch | |
| 7,921,910 B2 | 4/2011 | Wilson et al. | |
| 7,937,222 B2 | 5/2011 | Donadille et al. | |
| 8,168,570 B2 | 5/2012 | Barron et al. | |
| 8,633,700 B1 | 1/2014 | England et al. | |
| 8,680,866 B2 | 3/2014 | Marsala et al. | |
| 8,773,132 B2 | 7/2014 | Eick et al. | |
| 8,812,237 B2 | 8/2014 | Wilt et al. | |
| 8,826,982 B2 | 9/2014 | Tambini et al. | |
| 8,931,553 B2 | 1/2015 | Cannan et al. | |
| 9,250,351 B2 | 2/2016 | Aldridge et al. | |
| 2001/0033164 A1 | 10/2001 | Vinegar et al. | |
| 2002/0000317 A1 | 1/2002 | Rayssiguier et al. | |
| 2002/0145423 A1 | 10/2002 | Yoo | |
| 2002/0174728 A1 | 11/2002 | Beresford et al. | |
| 2002/0179301 A1 | 12/2002 | Schultz et al. | |
| 2003/0094282 A1 | 5/2003 | Goode et al. | |
| 2003/0106684 A1 | 6/2003 | Hooper | |

(56) References Cited

U.S. PATENT DOCUMENTS

| | | |
|---|---|---|
| 2003/0205376 A1 | 11/2003 | Ayoub et al. |
| 2004/0239316 A1 | 12/2004 | Yoo |
| 2005/0017723 A1 | 1/2005 | Entov et al. |
| 2005/0254343 A1* | 11/2005 | Saiki ............... G01V 1/36 367/31 |
| 2005/0274510 A1 | 12/2005 | Nguyen et al. |
| 2006/0062084 A1 | 3/2006 | Drew |
| 2006/0120217 A1* | 6/2006 | Wu ................. G01V 1/44 367/32 |
| 2007/0035438 A1 | 2/2007 | Witten |
| 2007/0278008 A1 | 12/2007 | Kuckes et al. |
| 2008/0230219 A1 | 9/2008 | Kaminsky |
| 2008/0264162 A1 | 10/2008 | Glasbergen et al. |
| 2008/0271885 A1 | 11/2008 | Kaminsky |
| 2008/0316049 A1 | 12/2008 | Verret et al. |
| 2009/0010104 A1 | 1/2009 | Leaney |
| 2009/0056938 A1 | 3/2009 | Treviranus et al. |
| 2009/0166030 A1 | 7/2009 | Zhuravlev et al. |
| 2009/0179649 A1 | 7/2009 | Schmidt et al. |
| 2009/0211754 A1 | 8/2009 | Verret et al. |
| 2009/0250216 A1 | 10/2009 | Bicerano |
| 2009/0288820 A1 | 11/2009 | Barron et al. |
| 2010/0044034 A1 | 2/2010 | Bailey et al. |
| 2010/0051266 A1 | 3/2010 | Roddy et al. |
| 2010/0066560 A1 | 3/2010 | McDaniel et al. |
| 2010/0078169 A1 | 4/2010 | Symington et al. |
| 2010/0101793 A1 | 4/2010 | Symington et al. |
| 2010/0102986 A1 | 4/2010 | Benischek et al. |
| 2010/0147512 A1* | 6/2010 | Cramer ............. E21B 43/267 166/250.1 |
| 2010/0223988 A1 | 9/2010 | Crow et al. |
| 2010/0234249 A1 | 9/2010 | McDaniel et al. |
| 2010/0250207 A1 | 9/2010 | Rodney |
| 2010/0282460 A1 | 11/2010 | Stone et al. |
| 2010/0314108 A1 | 12/2010 | Crews et al. |
| 2011/0056687 A1 | 3/2011 | Fripp |
| 2011/0120710 A1 | 5/2011 | Dong et al. |
| 2011/0125014 A1 | 5/2011 | Derode et al. |
| 2011/0276273 A1* | 11/2011 | Artman ............. G01V 1/282 702/16 |
| 2011/0288831 A1* | 11/2011 | Tan ................. G01V 1/282 703/2 |
| 2012/0146648 A1 | 6/2012 | Eick et al. |
| 2012/0181020 A1 | 7/2012 | Barron et al. |
| 2012/0250455 A1* | 10/2012 | Djikpesse .......... G01V 1/28 367/14 |
| 2013/0013275 A1 | 1/2013 | Natarajan |
| 2013/0138408 A1 | 5/2013 | Lee et al. |
| 2013/0169278 A1 | 7/2013 | Bittar et al. |
| 2013/0300419 A1 | 11/2013 | Hibbs |
| 2014/0041862 A1* | 2/2014 | Ersoz ............... G01V 3/30 166/250.1 |
| 2014/0184228 A1 | 7/2014 | Fu et al. |
| 2014/0190686 A1 | 7/2014 | Cannan et al. |
| 2014/0226437 A1 | 8/2014 | Chambers et al. |
| 2014/0239957 A1 | 8/2014 | Zhang et al. |
| 2014/0361777 A1 | 12/2014 | Marsala et al. |
| 2014/0374091 A1* | 12/2014 | Wilt ................. E21B 43/267 166/254.1 |
| 2015/0253453 A1 | 9/2015 | Aldridge et al. |

FOREIGN PATENT DOCUMENTS

| | | |
|---|---|---|
| WO | WO 2014/107608 | 7/2014 |
| WO | 2014/144917 A1 | 9/2014 |
| WO | 2015/134054 A1 | 1/2015 |

OTHER PUBLICATIONS

Weglein et al., Reverse time migration and Green's theorem: Part II—A new and consistent theory that progresses and corrects current RTM concepts and methods, Feb. 8, 2012, Journal of Seismic Exploration, p. 1-23.*

Wombell, Inverse scattering within the distorted-wave Born approxima tion, Inverse Problems 4 (1988) L23-L27.*

Gurevich et al., Velocity and attenuation of elastic waves in finely layered porous rocks, Geophys J. Inr. (1995) 121, p. 913-637.

International Search Report and Written Opinion for PCT/US2014/010228 prepared by the ISA/US on May 5, 2014 (9 pages).

Bartel, L.C., McCann, R.P., and Keck, L.J., Use of potential gradients in massive hydraulic fracture mapping and characterization, 51st Annual Fall Technical Conference and Exhibition of Society of Petroleum Engineers, New Orleans, Oct. 3-6, 1976 SPE 6090.

Bartel, L.C., Application of EM Holographic Methods to Borehole Vertical Electric Source Data to Map a Fuel Oil Spill, Sandia National Laboratories, 1993.

Lee, K.H., et al., A new approach to modeling the electromagnetic response to conductive media, Geophysics, vol. 54, No. 9 (1989).

Lee, K.H., et al., Tomographic Imaging of Electrical Conductivity of Using Low-Frequency Electromagnetic Fields, Lawrence Berkeley Lab, 1992.

Al-Ali, Z.A., et al., Looking Deep into the Reservoir, Official Review, Summer 2009: 21, No. 2.

Rassenfoss, Stephen, Illuminating the Reservoir, Journal of Petroleum Technology, Jun. 2012.

Aderibigbe, Aderonke, et al., Detection of Propping Agents in Fractures Using Magnetic Susceptibility Measurements Enhanced by Magnetic Nanoparticles, Paper SPE 170818, presented at the SPE Annual Technical Conference and Exhibition: Society of Petroleum Engineers, Amsterdam, The Netherlands, Oct. 27-29, 2014.

Simpson, J. J. An Established Numerical Method Applied to Geophysics, EOS, Transactions, American Geophysical Union, Eos, vol. 93, No. 29, Jul. 17, 2012, pp. 265-288.

International Search Report and Written Opinion for PCT/US2015/043460 mailed Nov. 2, 2015 (17 pages).

International Search Report and Written Opinion for PCT/US2014/045427 prepared by the ISA/US on Jan. 21, 2015 (9 pages).

Yavuz et al., Frequency Dispersion Compensation in Time Reversal Techniques for UWB Electromagnetic Waves, IEEE Geoscience and Remote Sensing Letters, vol. 2, No. 2 Apr. 2005, pp. 233-237.

Liu et al., Electromagnetic Time-Reversal Source Localization in Changing Media: Experiment and Analysis, IEEE Transactions on Antennas and Propagation, vol. 55, No. 2, February 2007, pp. 344-354.

International Search Report and Written Opinion received in Patent Cooperation Treaty No. PCT/US2015/043460, mailed Nov. 2, 2015, 17 pages.

* cited by examiner

SYSTEMS AND METHODS FOR REMOVAL OF ELECTROMAGNETIC DISPERSION AND ATTENUATION FOR IMAGING OF PROPPANT IN AN INDUCED FRACTURE

BACKGROUND

Hydraulic fracturing is a process of initiating and subsequently propagating a fracture in a geologic formation through utilization of fracturing fluid. To create the fracture in the geologic formation, a drill is employed to create a well bore that reaches depths of several thousand feet (until a desired geologic formation is reached). A well casing is placed in the well bore. The well casing is typically composed of steel and is cemented in place to stabilize the well casing with respect to the Earth.

Hydraulic fracturing is commonly employed to enhance the fluid flow permeability of shale geologic formations for petroleum (oil and/or natural gas) and geothermal energy production. Subsequent to the well casing being cemented in place, a fracturing fluid is pumped down the well bore and through perforations in the well casing at a pressure that is in excess of the fracture gradient of the geologic formation. Such pressure causes the geologic formation to fracture. Pumping of the fracturing fluid down the well bore is continued to extend the fracture further into the formation. As the fracture extends, a proppant is added to the fracture fluid and pumped down the well bore and into the fracture, thereby propping the fracture open when pumping of the fracture fluid ceases. This causes the geologic formation to become permeable via the fracture, thereby allowing natural gas or oil to be extracted from the geologic formation. Hydraulic fractures can be induced using, vertical, horizontal and/or slanted wells. This process is commonly referred to as hydraulic fracturing.

Because a typical fracture and proppant placement occur thousands of feet beneath the surface of the Earth and because a propped fracture can extend from the well bore in a variety of directions and orientations, it is difficult to determine the location of a fracture and proppant within the geologic formation. Modeling techniques have been developed that attempt to use electromagnetic fields generated in the fracture and measured at the surface of the Earth to locate the proppant and fractures. Although these modeling techniques have been successful in helping to locate induced fractures and proppant, they can be limited by the dispersion and attenuation of the electromagnetic waves (e.g., electromagnetic waves having a frequency of less than 100 kHz) as they pass from the fracture, through various geologic media, to the surface of the Earth.

In particular, absorption of some of the generated fields can attenuate the signal that is eventually received at the surface. Because waves at different frequencies in a wave packet travel with different velocities, dispersion can cause an input signal to spread so that relatively high frequency input signal components are indistinguishable when detected at the surface. If care is not taken, dispersion and attenuation of electromagnetic signals from a fracture can negatively affect the accuracy with which the location of the fracture and proppant can be determined.

It would therefore be desirable to provide improved systems and methods for evaluating well hydraulic fracturing and completion techniques useful in extracting natural gas, oil and geothermal reserves from a geologic formation and specifically determine within reasonable error the spatial extent of proppant placed in the fracture under a specific set of hydraulic fracturing operating parameters.

SUMMARY

The following is a brief summary of subject matter that is described in greater detail herein. This summary is not intended to be limiting as to the scope of the claims.

Described herein are various technologies pertaining to determining the properties of a proppant filled fracture in a geologic formation. Properties include fracture size and geometry. These properties are determined or inferred from determined proppant properties of a proppant pack in and/or near the fracture. The fracture may be used to extract natural gas, oil and geothermal reserves from the geologic formation The disclosed methodology and associated modeling and/or imaging utilizes electromagnetic (EM) energy scattered from a subsurface geological, geophysical or artificial feature of interest to produce a highly-resolved three-dimensional (3D) image of the feature. The method may include producing an image or representation of a hydraulic fracture induced in a subsurface geologic formation after the fracture has been injected with propping material ("proppant") with favorable electromagnetic characteristics.

In various embodiments, properties such as the size, shape, location, orientation and/or extent of the proppant pack and fracture may be determined in an imaging and/or modeling operation that reduces or removes the effects of attenuation and dispersion of EM signals. The operation may be used to generate a three-dimensional image of proppant material within a fracture. As used herein, the terms "proppant material" and "proppant" refer to material that includes many (e.g., thousands, millions or more) of individual proppant particles or elements.

According to an embodiment, a system is provided that includes a database and a processor that receive measured electromagnetic field data, removes dispersion and attenuation effects from the measured electromagnetic field data to generate corrected electromagnetic field data, and generates an image of a proppant pack in a hydraulic fracture in a geologic formation using the corrected electromagnetic field data. The database and processor may include one or more databases and/or processors.

According to another embodiment, a system is provided that includes a database that stores a propagator and a window function; and a processor configured to receive measured electromagnetic field data from a plurality of sensors at a plurality of sensor locations, back propagate the measured electromagnetic field data from the sensor locations to a set of source locations using the propagator and the window function, and generate an image of a proppant pack in a fracture in a geologic formation using the back propagated measured electromagnetic field data.

According to an embodiment, a method is provided that includes capturing measured electromagnetic field data with a plurality of sensors at a plurality of sensor locations; back propagating the measured electromagnetic field data from the sensor locations to a set of source locations using a propagator and a window function; and generating an image of a proppant pack in a fracture in a geologic formation using the back propagated measured electromagnetic field data.

According to an embodiment, a system is provided that includes a well bore having a conductive casing that runs from a surface of the Earth to a geologic formation; a proppant pack formed in at least a portion of a fracture extending from the well bore into the geologic formation; a current source configured to electrically energize the conductive casing; a plurality of sensors configured to capture electromagnetic fields generated by the energized conductive casing and the proppant pack; and computing equipment configured to back propagate the captured electromagnetic fields to form an image of the proppant pack.

According to an embodiment, a system and method for imaging a fracture is disclosed that includes field acquisition of EM data, insertion of favorable proppant material within the fracture, computer processing and modeling of the recorded data, and ultimately constructing a 3D image.

Other aspects will be appreciated upon reading and understanding the attached figures and description.

DETAILED DESCRIPTION

Figure 1:
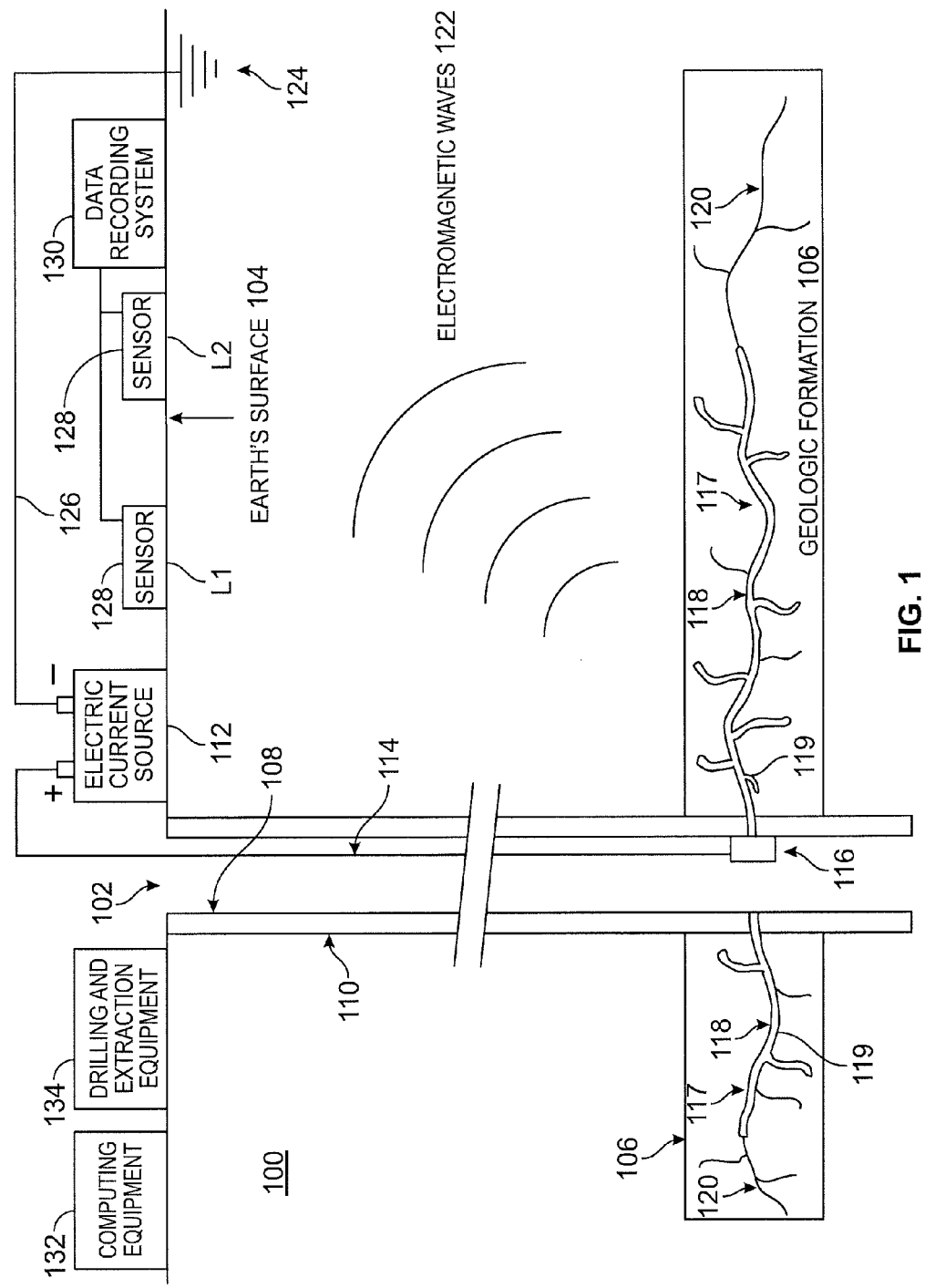
FIG. 1 is an exemplary diagram of a well system that is configured to extract natural gas or oil from a geologic formation beneath the surface of the Earth in accordance with an embodiment.

Various technologies pertaining to modeling and/or imaging a fracture in a geologic formation will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system computing components may be performed by multiple computing components. Similarly, a computing component may be configured to perform functionality that is described as being carried out by multiple computing components. Additionally, as used herein, the term "exemplary" is intended to mean serving as an illustration or example, and is not intended to indicate a preference.

As used herein, the term "computing component" is intended to encompass computer-readable data storage that is configured with computer-executable instructions that cause certain functionality to be performed when executed by a processor. The computer-executable instructions may include software, a routine, a function, or the like. It is also to be understood that a computing component or computing system may be localized on a single device or distributed across several devices.

With reference now to FIG. 1, an extraction system (system) 100 according to an embodiment of the disclosure is shown. The extraction system 100 is configured to extract natural gas, oil or geothermal resources by way of an induced fracture 117. The system 100 includes a well bore 102, which extends from the Earth's surface 104 to a subsurface geologic formation (formation) 106 that contains oil, natural gas or geothermal resources. While the well bore 102 is shown as being vertical in nature, it is to be understood that the well bore 102 and/or the formation may be vertical, horizontal, dipping, diagonal, slanting or any combination of these. As is well known, the well bore may extend generally vertical to reach the subsurface formation and then turn horizontal to extend horizontally or laterally through the formation. In such a configuration, the induced fracture 117 may extend vertically and/or horizontally outward from the well casing 108. In an exemplary embodiment, the formation 106 may be several thousand feet below the surface 104 of the Earth. Formation 106 may, for example, consist of shale rock, A well easing 108 may be positioned in the well bore 102 and extend from the surface 104 to or through to below the formation 106. The well casing 108 can be installed in the well bore 102 through utilization of any suitable method. Well casing 108 may be formed of a conductive material such as steel, A cement stabilizer 110 may be formed to stabilize the well casing 108 in the well bore 102. The cement stabilizer 110 stabilizes the casing 108 as fracture fluid and/or a proppant is transferred to the formation 106, possibly under high pressure. The cement stabilizer 110 can also stabilize the well casing 108 as natural gas, oil or thermal fluids are extracted from the geologic formation 106 by way of the well bore 102.

Through utilization of a fracturing fluid under high pressure, a fracture 117 including first portions 118 and second portions 120 is induced in the formation 106. In this exemplary embodiment, the fracture 117 is shown simplified as first and second portions 118, 120, however, it should be understood that the fracture 117 may contain several or multiple fractures, extending horizontally, vertically, and at various angles, and separate or branching from other induced fractures and combinations thereof. The fracture may extend laterally and vertically some distance in all directions from well bore 102. A proppant 119 is directed down the well bore 102 and fills or partially fills the first portions 118 of the fracture 117, thereby causing the first portions 118 to remain open (and thus causing the formation 106 to be more permeable for fluid flow). The proppant 119 filling the first portions 118 may be referred to as a "proppant pack" filling the first portions 118 (indicated as the bold lines) of the fracture 117. The second portions 120 of the fracture 117 not filled by proppant 119 is indicated as the lighter lines, and is typically filled with water, sand, gas and/or other rock particles from the surrounding formation 106.

Electrical equipment such as an electric current source 112, which typically resides on the Earth's surface 104 is coupled to the casing 108 at a current injection (or current application) point 116 (e.g., positioned near the bottom of well bore 102 in contact with casing 108 proximate to the geologic formation 106 and the proppant-filled fracture 118). In another embodiment, the electric current source 112 may reside on or below the surface. In another embodiment, the current injection point 116 may be located within geologic formation 106, but not in contact with fracture portion 118, or it may be located entirely outside geologic formation 106. Electric current is carried from the current source 112 to the injection point 116 via an insulated wire 114 within the well bore 102. Alternately, the insulated wire 114 may be located on the exterior of the casing 108 (i.e., between casing 108 and cement 110). In still another embodiment, the electric current source 112 may be located within well bore 102 proximate to the current injection point 116. The electric current source 112 may be configured to generate input current waveforms of various types (i.e., pulses, continuous wave, or repeating or periodic waveforms) that generate input electromagnetic field waveforms having a corresponding amplitude and corresponding temporal characteristics to the input current waveform. Accordingly, the conductive casing 108 can be electrically energized and act as a spatially-extended source of electric current.

Some of the electric current generated by the source 112 can travel from the well casing 108 through the proppant 119 of the induced fracture 117 of the geologic formation 106. Electromagnetic fields generated by the current in the well casing 108 and that propagate to various locations in a volume of Earth can be altered by the presence of the proppant following the injection of the proppant 119 into a fracture 117.

The proppant 119 can be chosen to have electromagnetically suitable properties for generating, propagating, and/or scattering electromagnetic fields that can be detected at the Earth's surface 104. For example, the proppant 119 may be chosen to have a particular electric permittivity, magnetic permeability, current conductivity, and/or other electromagnetic or mechanical properties that are different from the corresponding properties of the surrounding rock of formation 106. In this way, the first portions 118 of a fracture 117 that is filled with proppant 119 will have different electromagnetic properties from the second portions 120 of the fracture 117 not filled with proppant 119, as well as the rock of the surrounding geologic formation 106. The proppant 119 can, for example, be formed from an electrically conductive material to significantly enhance the electric conductivity of the first portions 118.

In one embodiment, all of the proppant that is injected into the well bore and the fracture can be formed from the conductive proppant material. However, this is merely illustrative. In various embodiments, the proppant material can include portions having different electromagnetic properties in different portions of the well bore and/or the fracture. For example, in some circumstances it may be desirable to have conductive proppant in one portion of a fracture (e.g., a portion of the fracture that is furthest from the well bore or a portion of the fracture that is nearest to the well bore) and non-conductive proppant in another portion of the fracture or in the well bore. In another example, it may be desirable to have proppant material with continuously or discretely varying electromagnetic properties as a function of the position of the proppant material in the fracture.

Providing proppant material having differing electromagnetic properties (e.g., non-conductive and conductive proppant) into a fracture may include mixing conductive materials of differing concentrations into the proppant material as it is injected into the well bore in continuously or discretely varying time intervals or may include first injecting conductive proppant into the well bore followed by injecting non-conductive proppant (as examples). In an embodiment, the proppant may include both conductive and nonconductive proppant materials. For example, the first five, ten, or twenty percent of the proppant material that is provided into the well bore may be conductive proppant and the remaining ninety-five, ninety, or eighty percent of the proppant material that is provided into the well bore may be non-conductive proppant so that only the fracture (or only a leading portion of the fracture) may be filled with the conductive portion of the proppant material. It should be appreciated that these examples are merely illustrative and that in general any electromagnetically suitable proppant material for generating or scattering electromagnetic fields that can be detected at sensors 128 can be provided.

Electric current source 112 situated on the Earth's surface 104 generates electric current that flows down the insulated wire 114 to the current injection point 116 proximate to geologic formation 106 and the proppant-filled first fracture portions 118 contained therein. As the injection point 116 is in direct physical contact with the well casing 108 and the proppant-filled first fracture portions 118, electric current can flow from injection point 116 to the conductive well casing 108 and the conductive proppant-filled fracture first portions 118. Current flows along the well casing and within the proppant. Current flow within well casing 108 is generally vertically upwards when the grounding point 124 is at the Earth's surface near or at the well casing 108, whereas current flow within the proppant-filled first fracture portions 118 is laterally outwards into geologic formation 106. Electromagnetic fields 122 generated by the currents in both the well casing 108 and the proppant 119 propagate to various locations in a three-dimensional volume of Earth. In another embodiment, the electric current source may be located on or below the Earth's surface.

Electric currents associated with the electromagnetic waves 122 flow generally toward the current grounding point 124 situated on the Earth's surface 104 along the path of least resistance to the grounding point 124. In another embodiment, grounding point 124 may be located on or slightly beneath the Earth's surface near to or far from the well bore 102. In another embodiment, grounding point 124 can be located beneath the surface 104 in another borehole that is relatively near to or far from the well and extraction system 100 and/or geologic formation 106. The other borehole may or may not be used in the fracturing process. Grounding point 124 is connected to the electric current source 112 via the shielded, insulated wire 126. In this manner, the insulated wire 114, current injection device 116, well casing 108, proppant-filled first fracture portions 118, electromagnetic waves 122 propagating within the Earth, grounding device 124, and insulating wire 126 constitute a "closed loop" that carries electric current from and ultimately back to the electric current source 112. In an embodiment, the insulated wire 114 may be shielded and/or the wires may be disposed in a wireline.

One or more sensors, such as sensors 128, are positioned on the surface 104 of the Earth. In another embodiment, one or more sensors 128 may be positioned on, above or below the surface 104. Sensors 128 are used to detect electromagnetic fields such as the electromagnetic waves 122 that propagate from the energized well casing 108 and the proppant-filled fracture first portions 118 to the sensors 128. For example, sensors 128 may each include a transducer (not shown) for sensing an EM wave. The sensors 128 may include one or more antennas and receiver circuitry for receiving, capturing, transmitting, processing, digitizing, or otherwise handling electromagnetic field data.

Sensors 128 may be located at corresponding locations such as sensor locations L1 and L2. Sensors 128 may be deployed in a one-, two-, or three-dimensional distribution at or near surface 104. For example, sensors 128 may be positioned on surface 104, beneath surface 104 and/or suspended or mounted above surface 104. Additionally, sensors 128 may be deployed in various other subsurface boreholes located near to, or at some distance away from, the geologic formation 106. In various embodiments, the optimal locations of sensors 128 for detecting electromagnetic fields can be determined through numerical modeling. Sensors 128 may include various types of physical transducers appropriate for detecting electric fields and/or magnetic fields, and converting these physical signals to voltages or other signals that are subsequently forwarded to the data recording system 130. In particular, sensors commonly used for geophysical exploration or characterization purposes (e.g., porous pots, metal electrodes, electric/magnetic pickup coils, antennas) may be used.

Sensors 128 are connected to the data recording system 130. The data recording system 130 has the capability to receive, amplify, filter, digitize, process, and otherwise handle the signals (e.g., voltage signals) generated by sensors 128 in response to the incident electromagnetic waves 122. Additionally, data recording system 130 may store these digitized and processed signals on an appropriate recording medium contained therein. Alternately, the data recording system 130 may transmit the received signals to computing equipment 132 where additional processing operations may be conducted and the data are stored therein. The computing equipment 132 may be located proximate to the data recording system 130, or it may be situated in a remote location. Transmission of data between the recording system 130 and computing equipment 132 may be via a wired or wireless connection such as via an electrical wire or via radio-transmission techniques.

In certain embodiments, a sensor 128, a data recording system 130, and computing equipment 132 may be incorporated into a single physical package or unit capable of being deployed either on the Earth's surface 104, or within a subsurface borehole. In this manner, the separate functions of signal transduction, amplification, filtering, digitizing, processing, etc. and storage are contained within one physical device Computing equipment 132 may be used to store a geophysical/geological model representing the three-dimensional volume of the Earth supporting the propagating electromagnetic waves 122 (which includes the particular geologic formation 106 containing the fracture 117). Computing equipment 132 may also store data corresponding to the known location of the current injection point 116, as well as the known input waveform of the electric current generated by the current source 112. Computing equipment 132 may also store the known three-dimensional configuration of the well bore 102 with associated casing 108 and cement 110, and the known locations of the electromagnetic sensors 128. Computing equipment 132 may also store one or more propagator functions and/or window functions. Computing equipment 132 may also store data one or more estimated or determined source locations.

Computing equipment 132 may also store numerical algorithms appropriate for calculating various electromagnetic fields, including those incident on surface sensors 128 (as with the electromagnetic waves 122), scattered from a proppant pack source, incident on a plurality of estimated source locations (e.g., a grid of estimated source locations such as subsurface Born scattering locations), and/or generated or scattered from the plurality of source locations (e.g., scattered by the subsurface Born scatterers at the subsurface Born scattering locations).

Computing equipment 132 may also possess numerical algorithms appropriate for receiving electromagnetic field data from sensors 128 and/or the recording system 130, removing dispersion and/or attenuation effects from the received electromagnetic field data, back propagating the received electromagnetic field data to the plurality of source locations, and/or generating an image of a proppant pack based on the dispersion and/or attenuation removed field data. Computing equipment 132 may also possess numerical algorithms appropriate for removing dispersion and/or attenuation effects from the received electromagnetic field data by transforming time series captured electromagnetic field data into a frequency domain, back propagating the transformed data using a propagator function and a window function, and inverse transforming the back-propagated data to obtain the dispersion and/or attenuation removed field data.

Computing equipment 132 may also possess numerical algorithms appropriate for generating an image of a proppant pack based on the dispersion and/or attenuation removed field data by, for example, determining locations at which the dispersion and/or attenuation corrected electromagnetic field data for multiple sensors coalesce, thereby indicating the location and geometry of the proppant 119 within the fracture 118. Computing equipment 132 may also possess numerical algorithms appropriate for generating an image of a proppant pack based on the dispersion and/or attenuation removed field data by adjusting the parameters of a fracture model of the subsurface using these dispersion and/or attenuation removed field data, and determining the location and geometry of the proppant 119 within the fracture 118 using these adjusted parameters. Computing equipment 132 may also possess numerical algorithms appropriate for generating an image of a proppant pack based on the dispersion and/or attenuation removed field data by adjusting the parameters of a First Born Approximation (FBA) model of the subsurface using these dispersion and/or attenuation removed field data, and determining the location and geometry of the proppant 119 within the fracture 118 using these adjusted parameters.

Computing equipment 132 may be used to generate an image of the proppant-filled portions 118 of the fracture 117 using appropriate visualization software, by plotting in three-dimensional space the source locations or the magnitudes of the Born scatterers (as examples). Computing equipment 132 may perform all suitable computing, analysis, numerical simulation, data processing, and visualization functions associated with dispersion and/or attenuation correction procedure, an image generation procedure based on the dispersion and/or attenuation correction procedure, a forward modeling procedure, an inversion procedure, and/or a Born Scattering Inversion (BSI) procedure for imaging the proppant-filled portions 118 of fracture 117.

Sensors 128 may be used to gather electromagnetic field data before, during, and/or after the hydraulic fracturing and proppant injection operations. Equipment such as drilling and extraction equipment 134 for creating, reinforcing, pumping, extracting or other drilling and/or extraction operations may be present in the vicinity of the well bore 102. The locations of computing equipment 132 should be maintained during gathering of all electromagnetic field data by sensors 128 so that any electrically conductive equipment does not move or change operations, and thus undesirably alter the electromagnetic fields to be measured. In this way, changes in measured electromagnetic fields before and after the hydraulic fracturing and proppant insertion operations can be primarily or completely attributed to the presence of the proppant-pack 119 within the fracture, thereby increasing the likelihood that back propagated (e.g., dispersion and/or attenuation corrected) electromagnetic field data corresponds to electromagnetic fields generated and/or scattered by the proppant pack. In embodiments in which a BSI process is performed using a First Born Approximation, ensuring, in this way, that changes in measured electromagnetic fields before and after the hydraulic fracturing and proppant insertion operations can be primarily or completely attributed to the presence of the proppant-pack 119 within the fracture, may also increase the likelihood that the First Born Approximation is applicable to the scattered electromagnetic fields.

It can therefore be ascertained that by electrically energizing the well casing 108 (via the current insertion device 116) to cause it to act as a source of electric current, an electromagnetic field can be induced and recorded by sensors 128 at the surface 104 of the Earth. These recordings, taken before and/or after fracturing and proppant insertion, can subsequently be corrected to remove dispersion and/or attenuation effects suffered by the electromagnetic fields as they passed through layers of the Earth from the fracture to the surface, and these dispersion and/or attenuation corrected data can be used to generate an image of proppant-filled portion 118 of the fracture 117 within geologic formation 106 (e.g., by using constructive and/or destructive interference of back propagated waves to determine source locations and/or by adjusting the parameters of a fracture model such as a forward model, an inversion model, and/or a First Born Approximation model of the scattered electromagnetic fields).

As used herein, the term "geometry" can refer to the size, shape, length, height, width, orientation, and/or other physical dimensions (e.g., of one or more portions of the proppant-filled portions 118 of the fracture 117). "Orientation" can refer to the orientation of at least a portion of the proppant-filled fracture 118 relative to the surface 104 or the well bore 102 in the subsurface. The term "location" can refer to the position of the fracture portion 118 relative to the surface 104, the well bore 102, and/or the current injection point 116.

Figure 2:
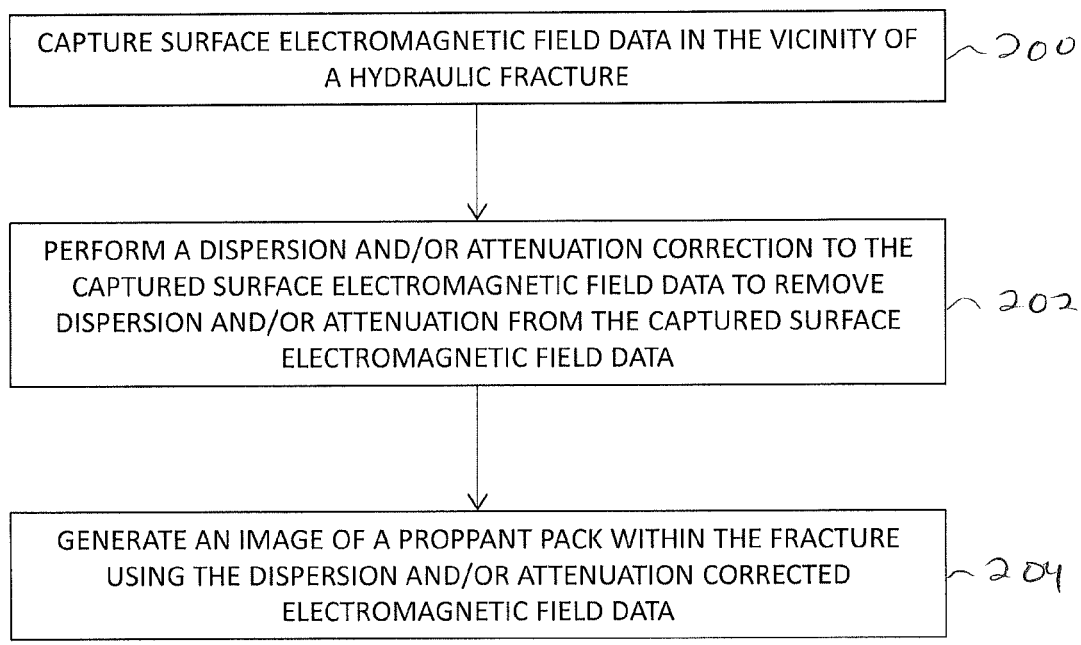
FIG. 2 is a flow diagram that illustrates an exemplary process for computing a location, length, orientation and/or image of proppant within a fracture in a geologic formation beneath the surface of the Earth in accordance with an embodiment.

With reference now to FIG. 2, illustrative operations that may be performed by computing equipment, such as described above in connection with FIG. 1 to determine a location and/or an image of a hydraulic fracture in a geologic formation are shown.

At block 200 electromagnetic fields in the vicinity of a hydraulic fracture may be captured or measured. For example, the electromagnetic fields in the vicinity of a hydraulic fracture may be captured or measured before and/or after the fracture is generated. The hydraulic fracture may include a proppant material having electromagnetic properties configured to enhance the detectability of the surface electromagnetic fields. Electromagnetic fields may also be measured during a hydraulic fracturing operation to create the hydraulic fracture. The hydraulic fracture may be generated in a geologic formation in a volume of the Earth. The captured electromagnetic fields may be surface magnetic fields captured using sensors at or near the surface of the Earth and/or electromagnetic fields captured using sensors in an adjacent well bore.

The electromagnetic fields may be generated, for example, by electrically energizing the well bore (e.g., the casing) to form a leaky transmission line that emits electromagnetic fields into the portions of the Earth surrounding the wellbore. The emitted electromagnetic fields may be scattered by proppant material having suitable electromagnetic characteristics in some or all of one or more fractures extending from the wellbore. The scattered electromagnetic fields may propagate through layers of the earth to the surface to be captured. As the scattered electromagnetic fields propagate through the layers of the earth, the scattered electromagnetic fields may be attenuated by being absorbed by the earth and/or may be dispersed due to frequency-dependent propagation of the electromagnetic waves through the layers of the earth. The captured electromagnetic field data may therefore include signals having a reduced intensity due to attenuation and/or signals that have been effectively smeared or blended in time due to dispersion.

At block 202, a dispersion and/or attenuation correction to the captured surface electromagnetic field data may be performed to remove dispersion and/or attenuation contamination from the captured surface electromagnetic field data. As discussed in further detail hereinafter, performing a dispersion and/or attenuation correction to the captured surface electromagnetic field data may include back propagation of an electromagnetic response in the time domain.

At block 204, an image such as a three-dimensional image of the proppant pack may be generated using the dispersion and/or attenuation corrected electromagnetic field data. The size, shape, and orientation of the proppant pack within a fracture formation may also be determined using dispersion and/or attenuation corrected electromagnetic field data. As discussed in further detail hereinafter, generating an image of a proppant-pack using dispersion and/or attenuation corrected electromagnetic field data may include determining locations at which back propagated signals coalesce and therefore constructively interfere and/or may include using the dispersion and/or attenuation corrected electromagnetic field data to adjust the parameters of a model of a fracture (e.g., using forward modeling, inverse modeling, and/or First Born Approximation modeling techniques).

Figure 3:
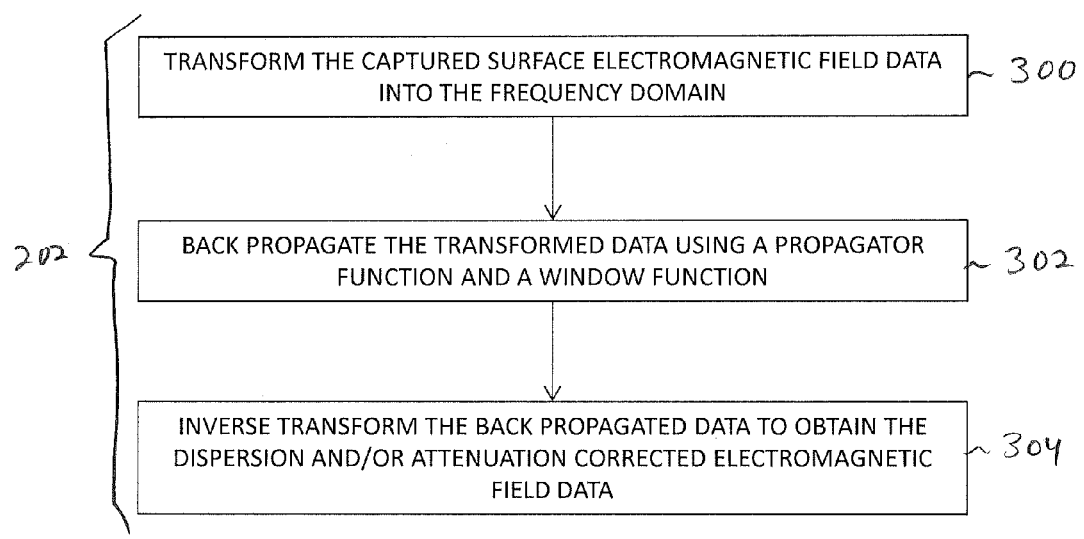
FIG. 3 is a flow diagram that illustrates an exemplary process for performing a dispersion and/or attenuation correction to captured surface electromagnetic field data in accordance with an embodiment.

Illustrative operations for performing a dispersion and/or attenuation correction to the captured surface electromagnetic field data as described above in connection with block 202 of FIG. 2 are shown in FIG. 3. The operations described in connection with FIG. 3 may be used to back propagate, in the time domain, a received electromagnetic signal from a sensor location to a source location and thereby remove the effects of attenuation and/or dispersion from the received electromagnetic signal, thereby increasing the resolution with which the geometry of the proppant pack may be determined (e.g., using knowledge of the electromagnetic properties of the Earth in the vicinity of the fracture).

At block 300, electromagnetic field data such as time series electromagnetic field data may be transformed (e.g., Fourier transformed) into the frequency domain. Transforming a time dependent signal into the frequency domain may be performed using any suitable transformation process.

At block 302, the transformed data in the frequency domain may be back propagated using, for example, a propagator function and a window function (e.g., to form back propagated frequency domain data). For example, a wave propagator (e.g., a plane wave propagator, a Green's function propagator or any suitable propagator for propagating an electromagnetic response from a sensor location to a source location while obeying the relevant physics) may be used to propagate the transformed signal back to, for example, its source location. The source location may be known, solved for using multiple signals, or can be estimated. The transformed data may be back propagated to more than one estimated source location (e.g., a grid of estimated source locations).

The propagator may be configured to remove the effects of dispersion and restore amplitudes of frequency content lost due to attenuation. In general, a wave vector that describes electromagnetic wave propagation in conducting media is complex—the real part propagates the signal and the imaginary part attenuates the signal. To back propagate an electromagnetic response (e.g., electromagnetic field data captured at a sensor), the sign in an exponential function in the propagator is determined so that, during the back propagation, the real part of the wave vector removes the effects of dispersion and the sign of the imaginary part is determined so that the imaginary part of the wave vector restores amplitudes of frequency content lost due to attenuation.

If care is not taken during back propagation operations, however, the exponential function in the propagator can cause the back propagated signal to become infinite. A window function (e.g., a Hanning window function or other suitable function for suppressing high frequency responses) can be applied to (e.g., multiplied by) the propagator to remove high frequency effects, thereby keeping the exponential function from going to infinity.

At block 304, the back propagated signal in the frequency domain (e.g., the back propagated frequency domain data) may be inverse transformed (e.g., using an inverse Fourier transformation) back to the time domain to obtain the dispersion and/or attenuation corrected electromagnetic field data.

Several back propagated signals (e.g., electromagnetic field data from several sensors) may tend to coalesce at the source location from which the signals originated and may therefore indicate the location of electrically conductive proppant that is the source of electromagnetic fields captured by the sensors (e.g., at the surface). The source locations may each correspond to a location within a proppant pack. The coalescing of the source locations from multiple signals can therefore be used to form an image of the proppant pack.

Figure 4:
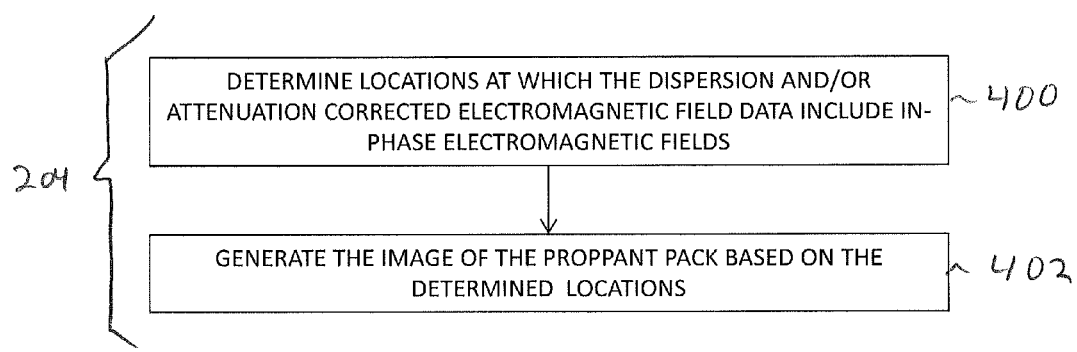
FIG. 4 is a flow diagram that illustrates an exemplary process for generating an image of a fracture based on dispersion and/or attenuation corrected electromagnetic field data in accordance with an embodiment.

Illustrative operations for generating an image such as a three-dimensional image of the proppant pack using source locations determined using a dispersion and/or attenuation correction of electromagnetic field data (e.g., in an embodiment for the operations of block 204 of FIG. 2) are shown in FIG. 4.

At block 400, locations at which the dispersion and/or attenuation corrected electromagnetic field data include in-phase electromagnetic fields may be determined. For example, the electromagnetic signal captured at each sensor at or near the surface may be back propagated as described above to each of a grid of locations within a volume of the Earth that includes the fracture. At some of the grid locations, the back propagated signals will be in phase and will constructively interfere. At other grid locations the back propagated signals will be out of phase and will destructively interfere. In another example, locations at which the back propagated signals constructively interfere (e.g., are in phase) may be actively determined while back propagating the multiple signals (e.g., in an iterative operation such as a Monte Carlo operation).

At block 402, the image of the proppant pack may be generated using the determined locations. For example, the determined locations (e.g., grid locations or actively determined locations) at which the back propagated signals constructively interfere may be determined to be locations at which electrically conductive proppant is located and a three-dimensional image of the proppant pack may be generated that shows the proppant pack at the determined locations.

Figure 5:
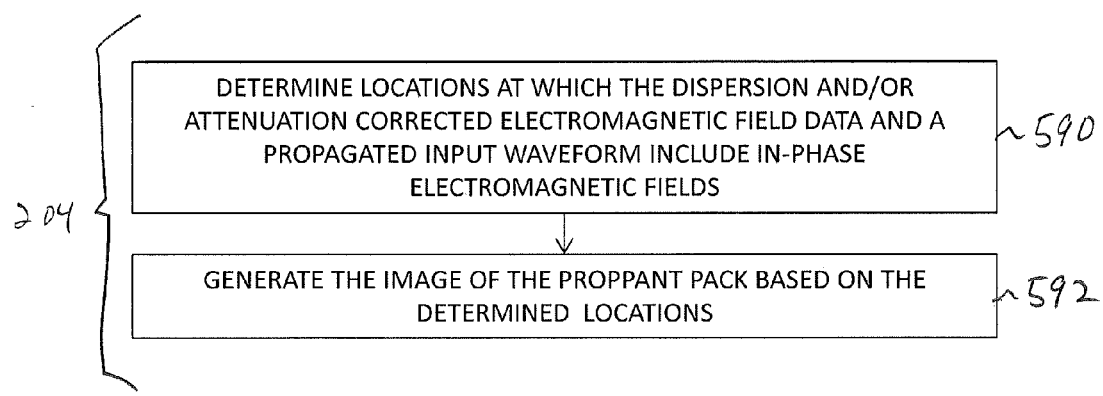
FIG. 5 is a flow diagram that illustrates an exemplary process for generating an image of a fracture based on dispersion and/or attenuation corrected electromagnetic field data and a propagated input waveform in accordance with an embodiment.

In one embodiment, dispersion and/or attenuation corrected electromagnetic field data may be used in combination with an input waveform in a holographic imaging process to form the image of the proppant pack. Illustrative operations for generating an image such as a three-dimensional image of the proppant pack using dispersion and/or attenuation corrected electromagnetic field data and an input waveform in a holographic imaging operation (e.g., in an embodiment for the operations of block 204 of FIG. 2) are shown in FIG. 5.

At block 590, locations at which the dispersion and/or attenuation corrected electromagnetic field data and a propagated input waveform include in-phase electromagnetic fields may be determined. For example, the electromagnetic signal captured at each sensor at or near the surface may be back propagated as described above to each of a grid of locations within a volume of the Earth that includes the fracture and an input waveform may also be propagated, to each of the grid of locations. At some of the grid locations, the back propagated signals and the propagated input waveform will constructively interfere. At other grid locations the back propagated signals and the propagated input waveform will destructively interfere. In another example, locations at which the back propagated signals and the propagated input waveform constructively interfere (e.g., are in phase) may be actively determined while back propagating the multiple signals and propagating the input waveform.

At block 592, the image of the proppant pack may be generated using the determined locations. For example, the determined locations (e.g., grid locations or actively determined locations) at which the back propagated signals and the propagated input waveform constructively interfere may be determined to be locations at which electrically conductive proppant is located and a three-dimensional image of the proppant pack may be generated that shows the proppant pack at the determined locations.

Figure 6:
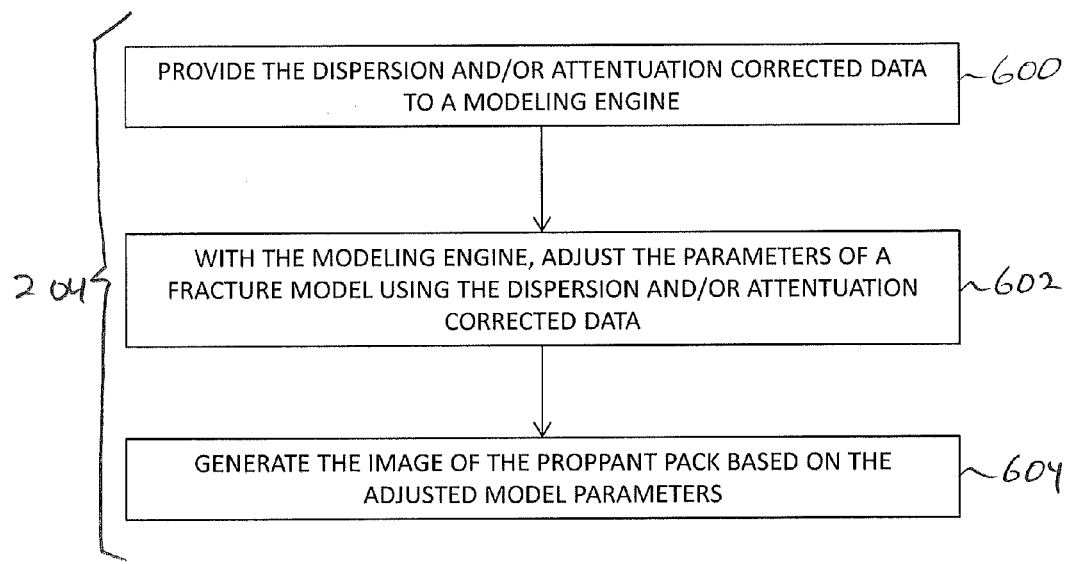
FIG. 6 is a flow diagram that illustrates an exemplary process for generating an image of a fracture based on dispersion and/or attenuation corrected electromagnetic field data by adjusting parameters of a fracture model using the corrected data in accordance with an embodiment.

The operations described above in connection with FIGS. 4 and 5 for generating the image of the proppant pack using dispersion and/or attenuation corrected electromagnetic field data (e.g., back propagated signals at source locations) are merely illustrative and the image of the proppant pack may be determined in other ways. For example, FIG. 6 shows illustrative operations that may be performed for using the dispersion and/or attenuation corrected electromagnetic field data in a modeling operation to form the image of the proppant pack.

At block 600, the dispersion and/or attenuation corrected electromagnetic field data may be provided to a modeling engine. The modeling engine may include a geophysical model of the Earth including a geologic formation in which a fracture has been or will be generated and one or more additional layers or other characteristics of the Earth at or near the formation. The modeling engine may also include an electromagnetic model for computing surface or other electromagnetic fields.

At block 602, with the modeling engine, the parameters of a fracture model (e.g., a model of a fracture in a geological formation as included in the geophysical model) may be varied using the dispersion and/or attenuation corrected electromagnetic field data. The parameters of the fracture model may include geometric parameters that determine the geometry and/or location of the modeled fracture and/or electromagnetic parameters that determine the electromagnetic properties of various locations and/or materials in or near the fracture. The modeling engine may include software or hardware for implementing an algorithm for varying, optimizing, and/or selecting the parameters the fracture model. In one example, the modeling engine may minimize a difference between the dispersion and/or attenuation corrected electromagnetic field data and predicted electromagnetic field data based on the model of the fracture while varying the parameters to determine fitted parameters of the fracture model. In another example, the modeling engine may select a previously computed forward model of the fracture that has parameters that minimize the difference between the dispersion and/or attenuation corrected electromagnetic field data and predicted electromagnetic field data that has been generated based on the forward model. In one embodiment, the fracture model may be a First Born Approximation model.

At block 604, the image of the proppant pack may be generated based on the adjusted model parameters. For example, the adjusted model parameters may be the parameters of a mathematical description of the physical location and distribution of the proppant pack that can be formed into an image or the adjusted model parameters may be electromagnetic properties at a set of Born scatterer locations that can be used to form the image as described in further detail hereinafter.

Figure 7:
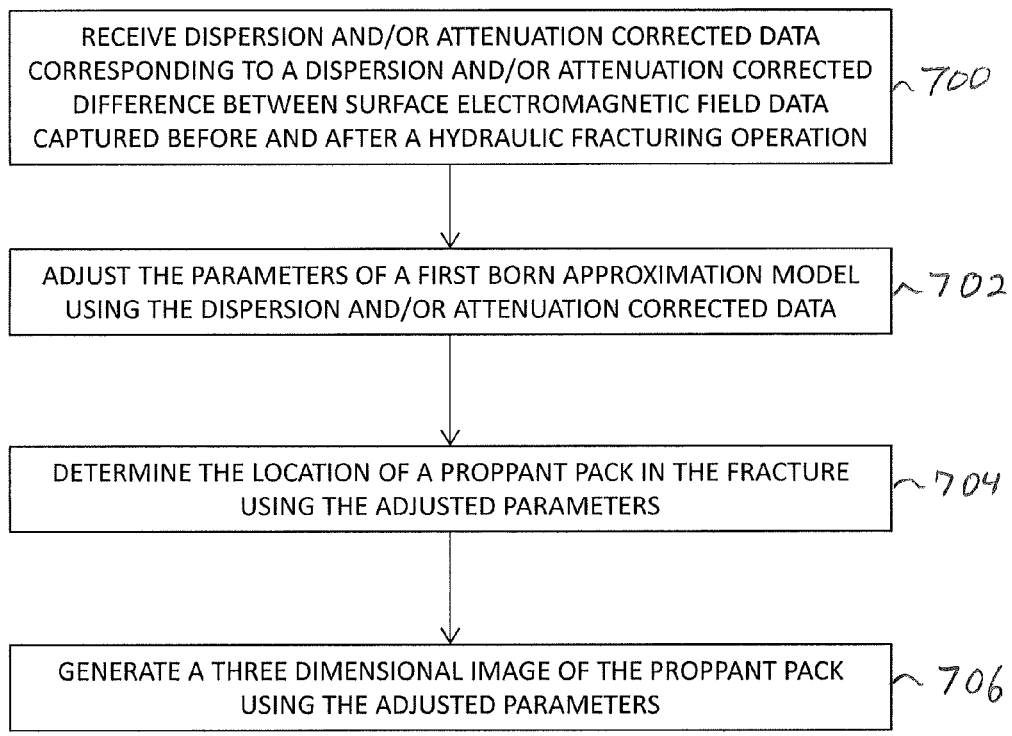
FIG. 7 is a flow diagram that illustrates an exemplary process for generating an image of a fracture based on dispersion and/or attenuation corrected electromagnetic field data by adjusting parameters of a First Born Approximation model using the corrected data in accordance with an embodiment.

Illustrative operations for generating an image such as a three-dimensional image of the proppant pack using dispersion and/or attenuation corrected electromagnetic field data to adjust the parameters of a First Born Approximation model are shown in FIG. 7.

At block 700, dispersion and/or attenuation corrected data corresponding to a dispersion and/or attenuation corrected difference between surface electromagnetic field data captured before and after a hydraulic fracturing operation may be received.

At block 702, the parameters of a First Born Approximation model may be adjusted using the dispersion and/or attenuation corrected data. The parameters of the FBA model may include a conductivity change parameter, a permittivity change parameter, and/or a permeability change parameter at the location of each of a set of Born scatterers in a volume of the Earth that includes the fracture as described in further detail hereinafter.

At block 704, the location of the proppant pack in the fracture may be determined using the adjusted parameters. The size, shape, and orientation of the proppant pack within a fracture formation may also be determined using the adjusted parameters.

At block 706, a three dimensional image of the proppant pack may be generated using the adjusted parameters.

Figure 8:
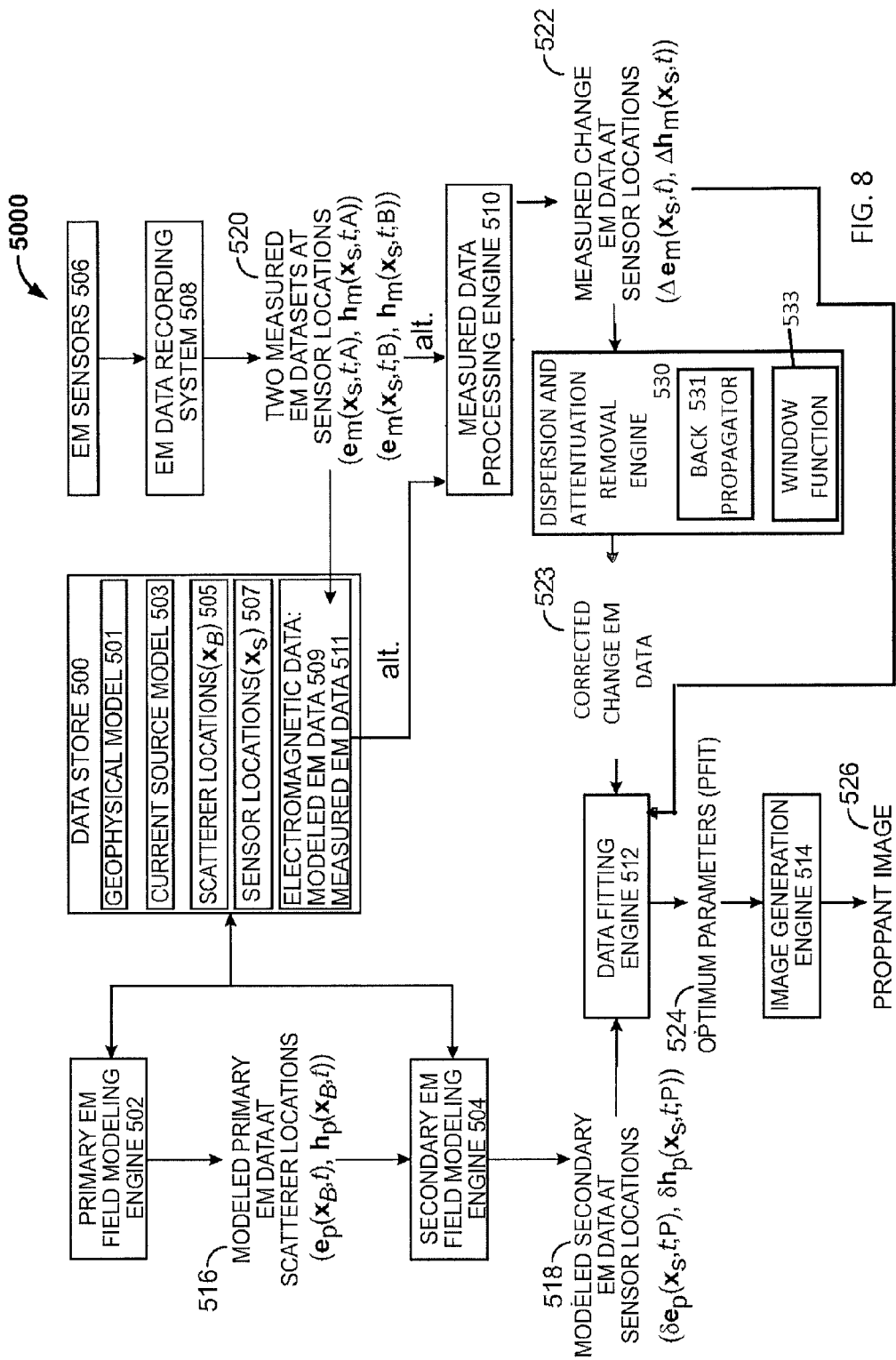
FIG. 8 is a functional block diagram of an exemplary system that facilitates computing a location and an image of a proppant in a fracture in a geologic formation beneath the surface of the Earth showing how data may be transferred and computed by the system in accordance with an embodiment.

With reference now to FIG. 8, an embodiment of a data flow and computation system 5000 is shown for determining the location of proppant and/or imaging the proppant in a fracture in a geologic formation using a First Born Approximation model based on dispersion and/or attenuation corrected electromagnetic field data. As shown in FIG. 8, the system 5000 includes a data store 500, a primary field modeling engine 502, a secondary field modeling engine 504, a measured data processing engine 510, a data fitting engine 512, an image generation engine 514, and a dispersion and attenuation removal engine 530.

Data store 500, primary field modeling engine 502, secondary field modeling engine 504, measured data processing engine 510, data fitting engine 512, dispersion and attenuation removal engine 530, and image generation engine 514 may be implemented on common computing equipment or one or more separate installations of computing equipment. In one embodiment, primary field modeling engine 502, secondary field modeling engine 504, and some or all of data store 500 may be located remotely from a drill site at which a well bore is located, and measured data processing engine 510, data fitting engine 512, dispersion and attenuation removal engine 530, and image generation engine 514 may be located at the drill site (e.g., incorporated into computing equipment 132 depicted in FIG. 1). However, this is merely illustrative. In various embodiments, data store 500, primary field modeling engine 502, secondary field modeling engine 504, measured data processing engine 510, data fitting engine 512, dispersion and attenuation removal engine 530, and image generation engine 514 may be included in computing equipment 132 (see FIG. 1), or implemented on any suitable computing equipment, near to or remote from the drill site.

As shown in FIG. 8, primary field modeling engine 502 and secondary field modeling engine 504 may be communicatively coupled to data store 500. If desired, other portions of system 5000 of FIG. 8 may also be communicatively coupled to data store 500. For example, primary field modeling engine 502, secondary field modeling engine 504, dispersion and attenuation removal engine 530, and/or any other portion of the system of FIG. 8 may have read and/or write access to memory and information stored on data store 500.

Data store 500 may be used to store a geophysical model 501, an electric current source model 503, one or more Born scatterer locations 505, one or more sensor types and locations 507, modeled and/or measured electromagnetic field data 509 and 511, or other pertinent information, data, numerical algorithms, and/or computer-readable instructions for use in the system of FIG. 8.

Geophysical model 501 may include stored data that describes the three-dimensional size, shape, and location of physical structures such as geologic formations, the Earth's surface, the well bore, the well casing, layers of rock, soil, and/or water between the fractured geologic formation 106 of FIG. 1 and the surface, drilling and extraction equipment at the drill site, other physical structures and the electromagnetic properties (e.g., conductivity, permeability, permittivity, etc.) of these structures.

Electromagnetic (EM) data stored on data store 500 may include modeled (i.e., calculated) EM data 509 and/or measured EM data 511. Measured EM data 511 may be provided to data store 500 from the EM data recording system 508, which may be physically located near the well site, as illustrated in FIG. 1. In addition to modeled and measured data, the data store 500 may hold executable code representing a First Born Approximation modeling process having a set of adjustable parameters P (e.g., a conductivity change parameter $\delta\sigma(x_B)$, a permittivity change parameter $\delta\epsilon(x_B)$, and/or a permeability change perimeter $\delta\mu(x_B)$ at each scatterer location $x_B$).

When executed by one or more processors using geophysical model 501, electric current source model 503, scatterer locations 505, and sensor locations 507, an electromagnetic forward modeling engine may provide calculated (or modeled) electromagnetic field values as functions of time t at selected locations. Electromagnetic field values may be computed by primary field modeling engine 502 and/or the secondary field modeling engine 504 using any suitable numerical modeling approach (e.g., a finite-differences process, a finite-elements process, a discontinuous Galerkin process, a Green function process, a layered media propagator process, or any other suitable numerical computation process).

Primary field modeling engine 502 is used to calculate primary electromagnetic (EM) field data 516 (e.g., primary or incident electromagnetic field values) at one or more Born scattering locations $x_B$ within a volume of the Earth that includes at least a portion of the geologic formation to be fractured. Modeled primary field data 516 may include a predicted primary electric field $e_p(x_B,t)$ and/or a predicted primary magnetic field $h_p(x_B,t)$, as functions of time t at scatterer locations $x_B$. Modeled primary field data 516 may be computed using geophysical model 501, electric current source model 503, and scatterer locations 505 stored in data store 500. Modeled primary field data 516 may also or alternatively include a predicted primary electric field $e_p(x_s,t)$ and/or a predicted primary magnetic field $h_p(x_B,t)$, as functions of time t at sensor locations $x_s$ Secondary field modeling engine 504 is used to calculate secondary electromagnetic (EM) field data 518 (e.g., secondary or scattered electromagnetic field values) at one or more sensor locations $x_s$ distributed on the Earth's surface (as with sensors 128 in FIG. 1) or within the Earth's subsurface. Modeled secondary field data 518 may include a predicted secondary electric field vector $\delta e_p(x_s,t; P)$ and/or a predicted magnetic field vector $\delta h_p(x_s,t; P)$ as functions of time t at sensor locations $x_s$. These modeled secondary electromagnetic fields are also functions of adjustable parameters P related to the strengths of the Born scattering sources. Modeled secondary field data 518 may be computed using geophysical model 501, electric current source model 503, scatterer locations 505, and sensor locations 507, and stored in data store 500. Modeled secondary field data 518 may also or alternatively include a predicted secondary electric field vector $\delta e_p(x_B,t; P)$ and/or a predicted magnetic field vector $\delta h_p(x_B,t; P)$ as functions of time t at source locations $x_B$.

Sensor locations 505 utilized by the primary and secondary field modeling engines represent locations L1 and L2 of sensors 128 illustrated in FIG. 1, and which also correspond to the locations of EM sensors 506 in FIG. 8. These sensors are used to measure electromagnetic (EM) field data before and after hydraulic fracturing and proppant insertion operations.

EM sensors 506 may forward measured data to the EM data recording system 508 where these data may be stored on appropriate recording media. For example, EM sensors 506 may be used to gather (capture) electromagnetic field data prior to a hydraulic fracturing and proppant insertion, and to gather electromagnetic field data after hydraulic fracturing and proppant insertion. These two measured EM datasets are referenced by letters A and B in FIG. 8, which may stand for EM data measured after and before fracturing and proppant insertion, respectively. Measured data may include an electric field vector $e_m(x_s,t; A \text{ and } B)$ and/or a magnetic field vector $h_m(x_s,t; A \text{ and } B)$ observed at sensor locations $x_s$, and are collectively referred to as two measured EM datasets at sensor locations 520. The two sets of measured EM data may be different due primarily or completely to the addition of proppant-filled fractures in geologic formation 106 (of FIG. 1).

The two measured EM datasets at sensor locations 520 (referenced by letters A and B) may be provided to measured data processing engine 510. Measured data processing engine 510 may receive these datasets via two alternate routes or pathways. In the first example, EM data recording system 508 forwards these data directly to measured data processing engine 510 in real time or near-real time as the EM data are measured. In the second example, EM data recording engine 508 forwards these data to data store 500, where they are held in computational memory as measured EM data 511 for later access by the measured data processing engine 510.

Measured data processing engine 510 may be used to perform various signal processing operations on the two measured EM data sets A and B in order to enhance signal quality, suppress noise, etc. Measured data processing engine 510 is then used to generate measured change EM data at sensor locations 522, based on the two measured EM datasets at sensor locations 520 (referenced by A and B). The measured change EM data 522 may, for example, include a difference (i.e., a subtraction) of datasets A and B. The measured change data may include an electric vector $\Delta e_m(x_s,t)$ and/or a magnetic vector $\Delta h_m(x_s,t)$. The measured change EM data at sensor locations 522 represents the scattered portion of the measured electromagnetic field data 520 generated by the presence of proppant in the fracture.

Modeled secondary EM data at sensor locations 518 (e.g., calculated secondary electromagnetic field data at the locations of sensors 506 based on an FBA modeling approach) and measured change EM data at sensor locations 522 (e.g., measured scattered electromagnetic field data at the sensor locations 506) may be provided to the data fitting engine 512. Because modeled secondary EM data 518 is generated using an initial set of adjustable parameters P that have not been informed by any measured information about a proppant-filled fracture, the modeled secondary EM data 518 and the measured change EM data 522 may be different.

Measured change EM data at sensor locations 522 may also be provided to dispersion and/or attenuation removal engine 530. Dispersion and/or attenuation removal engine 530 may include a back propagator 531 (e.g., a plane wave exponential propagator function or a spherical wave Green's function propagator including an exponential function divided by a radial distance from a source location). Dispersion and/or attenuation removal engine 530 may also include a window function 533. Dispersion and/or attenuation removal engine 530 may perform transformation operations, back propagation operations, windowing operations, and inverse transformation operations to back propagate measured change EM data 522 to one or more source locations such as a grid of source locations (e.g., scatterer locations $x_B$, or other grid locations) or actively determined source locations. Dispersion and/or attenuation removal engine 530 may generate corrected change EM data 523.

Corrected change EM data 523 may include time series electromagnetic source fields at the one or more source locations $x_B$, may include an image of the proppant, and/or may include time series electromagnetic fields at sensor locations $x_s$ in which the effects of dispersion and/or attenuation have been removed (e.g., by propagating the back propagated electromagnetic change data forward to the sensor locations in the absence of dispersion and/or attenuation effects).

Corrected change EM data 523 may be provided to data fitting engine 512 in addition to, or instead of, measured change EM data 522. Data fitting engine 512 may adjust the adjustable parameters (e.g., a set of parameters P corresponding to electromagnetic properties of material at the Born scatterer locations $X_B$) until the modeled secondary EM data at sensor locations 518 have been modified to match the measured change EM data at sensor locations 522 to within a predetermined or actively determined range.

In one embodiment, a weighted least squares difference may be used to quantify the degree of misfit between modeled data 518 and measured data 522. The particular set of parameters PFIT that minimizes the weighted least squares difference may be solved for using well known procedures from linear algebra. However, this is merely illustrative. In various other embodiments, any suitable data fitting procedure may be used to adjust the set of adjustable parameters P until an adequate fit between the modeled secondary EM data 518 and the measured change EM data 522 is obtained. The particular set of parameters that provides the best fit (i.e., the minimum misfit) constitutes the optimum parameters PFIT.

The optimum set of adjustable parameters 524 (i.e., fitted parameter set PFIT) that results in the modeled secondary EM data 518 that best matches the measured change EM data 522 may be provided to image generation engine 514. Image generation engine 514 may use the optimum parameters 524 to determine the location of proppant within a fracture and/or to generate a two or three-dimensional image 526 of the proppant pack. Because the adjustable parameters (P) each are proportional to the amount of change in an electromagnetic property of the material at a Born scatterer location, the values of the optimum parameters (PFIT) themselves can be used to construct a proppant image 526. The scatterer locations $x_B$ serve as effective image pixel (in two-dimensions) or voxel (in three-dimensions) coordinates. However, this is merely illustrative. In various embodiments, image generation engine 514 may perform image processing operations such as scaling, enhancement, smoothing, filtering or other image processing operations to form the proppant image 526.

In some embodiments, data fitting engine 512 may incorporate corrected change EM data 523 along with measured change EM data 522 in a comparison with modeled secondary EM data at source locations 518 while adjusting parameters P or may perform a comparison (e.g., minimization of misfit) of corrected change EM data 523 with modeled secondary EM data 518 while adjusting parameters P. In another embodiment, data fitting engine 512 may determine parameters PFIT using EM data 522 and modeled secondary EM data 518 and may then compare a back propagation image of the proppant pack (e.g., generated using corrected change EM data 523) with a BSI image of the proppant pack generated using the FBA model. In embodiments in which two images of the proppant pack are generated (e.g., a back propagation image and a BSI image), one of the images may be adjusted using the other of the images, or the images may be combined (e.g., averaged) to form a final image.

Although an operation combining a back propagation image with a BSI image is described herein as an example, it should be appreciated that a back propagation image of a proppant pack may be combined with an a proppant image or model generated using any suitable forward modeling, inversion, holographic method, or other method to improve the accuracy of the determined location, geometry, size, or other features of a proppant pack.

An image of a proppant pack such as image 526 may be generated in near-real time immediately after a hydraulic fracturing operation to provide a drilling manager or team with a three-dimensional image of the proppant inserted into the fracture. This image can then be immediately used to guide further fracturing and proppant-insertion operations.

Figure 9:
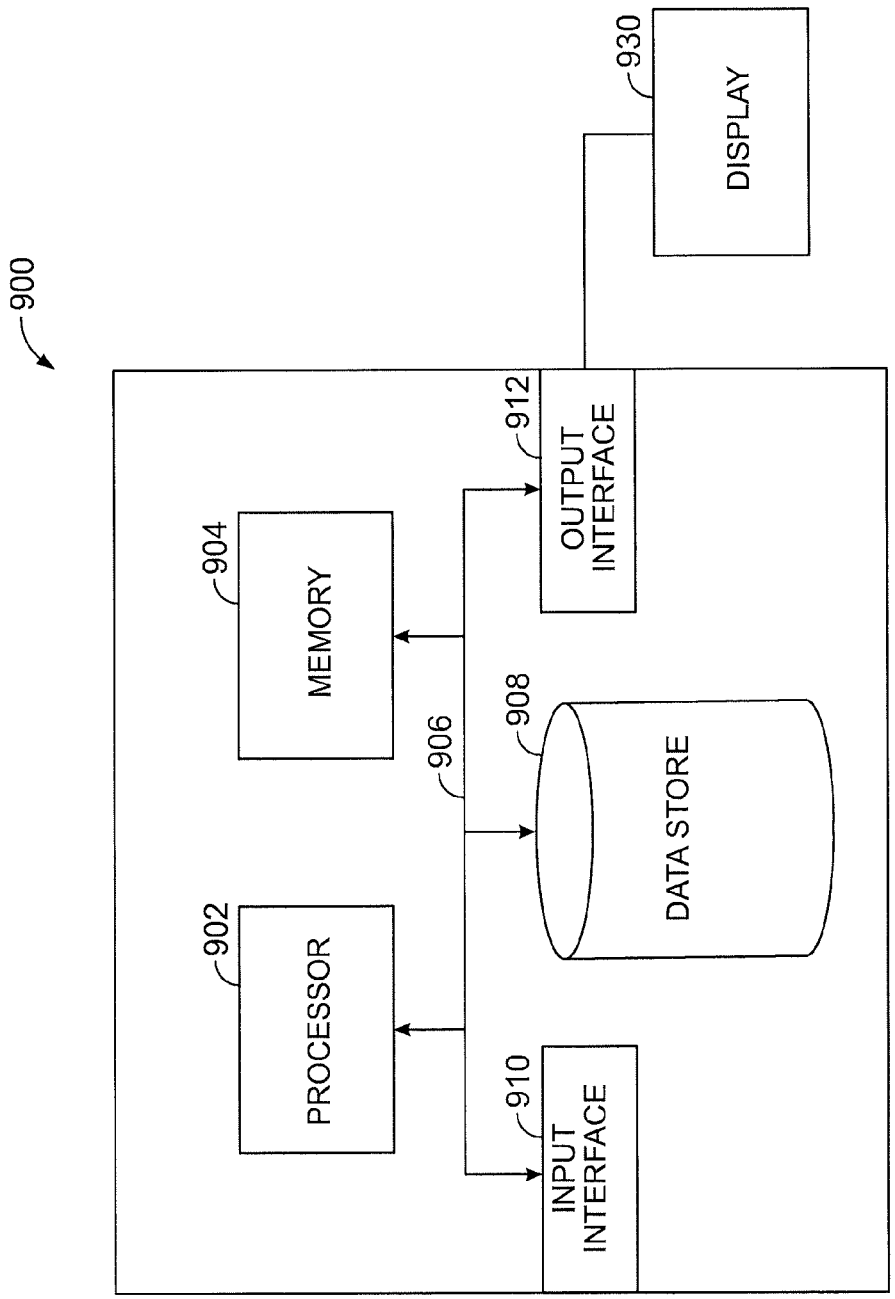
FIG. 9 is an exemplary computing system in accordance with an embodiment.

Now referring to FIG. 9, a high-level illustration of an exemplary computing device 900 that can be used in accordance with the systems and methodologies disclosed herein is illustrated. For instance, the computing device 900 may be used in a system that supports computing estimates, measurements, and/or corrections of electromagnetic fields induced by an energized well casing and proppant-filled fracture in a well system. In another example, at least a portion of the computing device 900 may be used in a system that supports estimating a size, location, length, orientation, and/or image of proppant within an induced fracture in a geologic formation beneath the surface of the Earth (e.g., using dispersion and/or attenuation corrected data). The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more computing components discussed above or instructions for implementing one or more of the methods described above. The processor 902 may access the memory 904 by way of a system bus 906. In addition to storing executable instructions, the memory 904 may also store computer-implemented models of well casing(s) and/or fracture(s), values indicative of an amount of electric current applied to a well casing, values indicative of a location on a well casing where electric current is applied, sensor locations, scatterer locations, a first Born approximation model having adjustable parameters, a propagator, or a window function (as examples).

The computing device 900 additionally includes a data store 908 that is accessible by the processor 902 by way of the system bus 906. The data store 908 may be or include any suitable computer-readable storage, including a hard disk, memory, etc. The data store 908 may include executable instructions, computer-implemented models, etc. The computing device 900 also includes an input interface 910 that allows external devices to communicate with the computing device 900. For instance, the input interface 910 may be used to receive instructions from an external computer device, a user, etc. The computing device 900 also includes an output interface 912 that interfaces the computing device 900 with one or more external devices. For example, the computing device 900 may display text, images, etc, on a display 930 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system, comprising:
   a well bore having a conductive casing that runs from a surface of the Earth to a geologic formation;
   a proppant pack formed in at least a portion of a fracture that extends from the well bore into the geologic formation;
   a current source configured to electrically energize the conductive casing;
   a plurality of sensors configured to capture electromagnetic fields generated by the energized conductive casing and the proppant pack; and
   computing equipment configured to back propagate the captured electromagnetic fields from a set of sensor locations to a set of source locations using a propagator and a window function by:
      applying the propagator and the window function to the captured electromagnetic fields to form back propagated measured electromagnetic field data,
      adjusting parameters of the First Born Approximation model with the back propagated measured electromagnetic field data to provide adjusted model parameters, and
      generating a three-dimensional image of the proppant pack in the fracture in the geologic formation using the adjusted model parameters,
   wherein the computing equipment comprises:
      a data store comprising computer readable storage having an executable code representing the First Born Approximation model stored thereon, the First Born Approximation model having a set of adjustable parameters;
      a primary field modeling engine in communication with the data store, wherein the primary field modeling engine calculates incident electromagnetic field values;
      a secondary field modeling engine in communication with the data store, wherein the secondary field modeling engine calculates scattered electromagnetic field values;
      a measured data processing engine in communication with the plurality of sensors and the data store, the measured data processing engine configured to generate measured change EM data;
      a dispersion and attenuation removal engine in communication with the measured data processing engine, the dispersion and attenuation removal engine configured to back propagate the measured change EM data to generate corrected change EM data;
      a data fitting engine in communication with the dispersion and attenuation removal engine and the primary and secondary field modeling engines, the data fitting engine configured to adjust the adjustable parameters until the calculated scattered electromagnetic field values have been modified to match the measured change EM data, wherein the adjustable parameters are a set of parameters P corresponding to electromagnetic properties of material at Born scatterer locations $X_B$; and
      an image generation engine in communication with the data fitting engine and configured to produce the three-dimensional image of the proppant pack.

2. The system of claim 1, wherein the primary field modeling engine and the secondary field modeling engine each compute electromagnetic field values using one or more numerical modeling algorithms selected from the group consisting of a finite-differences process, a finite-elements process, a discontinuous Galerkin process, a Green Function process, and a layered media propagator process and any combination thereof.

3. The system of claim 1, wherein the proppant pack comprises an electrically conductive proppant.

4. The system of claim 3, wherein the proppant pack comprises electrically-conductive proppant mixed with a non-electrically conductive proppant.

5. The system of claim 1, wherein the proppant pack comprises a non-electrically conductive proppant.

6. The system of claim 5, wherein the proppant pack comprises non-electrically conductive proppant mixed with an electrically conductive material.

7. The system of claim 1, wherein at least a portion of the plurality of sensors are located at or near the surface of the Earth.

8. The system of claim 1, wherein at least a portion of the plurality of sensors are located in a second well bore that is adjacent to the well bore.

9. The system of claim 1, wherein at least a portion of the plurality of sensors are configured to detect an electric field.

10. The system of claim 9, wherein the plurality of sensors each contain a physical transducer that detects an electric field.

11. The system of claim 1, wherein at least a portion of the plurality of sensors are configured to detect a magnetic field.

12. The system of claim 11, wherein the plurality of sensors each contain a physical transducer that detects a magnetic field.

* * * * *